United States Patent
Arunachalam et al.

(10) Patent No.: US 12,003,480 B1
(45) Date of Patent: Jun. 4, 2024

(54) EFFICIENT EMERGENCY COMMUNICATIONS FALLBACK

(71) Applicant: T-Mobile USA, Inc., Bellevue, WA (US)

(72) Inventors: Kameswaran Arunachalam, Redmond, WA (US); Rahul Pal, Bellevue, WA (US); Samir Ramesh Shura, Olathe, KS (US); Saravana Velusamy, Overland Park, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/334,666

(22) Filed: Jun. 14, 2023

(51) Int. Cl.
*H04L 61/5061* (2022.01)
*H04L 65/1016* (2022.01)
*H04L 65/1045* (2022.01)

(52) U.S. Cl.
CPC ...... *H04L 61/5061* (2022.05); *H04L 65/1016* (2013.01); *H04L 65/1045* (2022.05)

(58) Field of Classification Search
CPC ............. H04L 61/5061; H04L 65/1016; H04L 65/1045
See application file for complete search history.

(56) References Cited

U.S. PATENT DOCUMENTS

| | | | | |
|---|---|---|---|---|
| 9,800,589 | B1* | 10/2017 | Asveren | H04L 63/1408 |
| 2009/0296566 | A1* | 12/2009 | Yasrebl | H04L 41/5087 |
| | | | | 370/221 |
| 2019/0335534 | A1* | 10/2019 | Atarius | H04L 65/1016 |
| 2019/0387030 | A1* | 12/2019 | Sridhar | H04L 65/1069 |

FOREIGN PATENT DOCUMENTS

| | | | | |
|---|---|---|---|---|
| WO | WO-2016074747 A1 * | 5/2016 | | H04L 63/10 |
| WO | WO-2021093997 A1 * | 5/2021 | | H04L 65/1016 |

* cited by examiner

*Primary Examiner* — Philip C Lee
(74) *Attorney, Agent, or Firm* — Lee & Hayes, P.C.

(57) ABSTRACT

The authorized IP addresses configured at components in an IMS network may become out of sync with a first pool of IP addresses provided by a core network to UEs. This may result in emergency communications being received at the IMS network from a UE using a first IP address of the first pool of IP addresses that is not recognized by the IMS network. A session management component of the core network may automatically assign a second IP address from a second pool of IP addresses based on determining the session management component has not received an update notification from the IMS network within a threshold time (e.g., 500 milliseconds, 1000 milliseconds, etc.) from transmitting a request to establish a packet data communications session to the IMS network using the first IP address. The IMS network may then receive packets from the second IP address.

20 Claims, 5 Drawing Sheets

EFFICIENT EMERGENCY COMMUNICATIONS FALLBACK

BACKGROUND

The number of wireless communications devices (e.g., user devices such as mobile telephones, smartphones, tablets, laptops, etc.) and other types of computing devices connected to the Internet has rapidly grown since the Internet's inception. Along with the growth of end user devices, the wireless networks that support them have likewise increased in size and complexity. Maintaining and upgrading such networks requires frequent adjustment and replacement of equipment and configurations.

To properly route traffic for a particular device, its address (e.g., Internet protocol (IP) address) must be authorized for routing across the various components of the network. However, with complex networks involving many components, there is a potential for an address to be recognized as authorized by some components in the network while not recognized as authorized by others. For example, a new piece of equipment may be installed, and a user device IP address from a newly added pool of addresses that may not yet have been propagated throughout the network may be provided to the equipment. Thus, a component in the network may receive and reject traffic using one of these new addresses.

While this user device address recognition mismatch may typically prove to be a minor and temporary inconvenience, for emergency communications, such as 911 calls or texts, the failure to route such communications may result in delayed emergency responder response and/or increased risk of harm to a user attempting to initiate the emergency communications. Because there may be many different network devices and functions involved in establishing and facilitating communications in a network, and because the capabilities and configurations of other devices and/or functions may not be known to all devices and functions in the network, it may be challenging to ensure that emergency communications are quickly and efficiently established in a wireless network during network modifications, such as upgrades, migrations, and equipment replacement.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
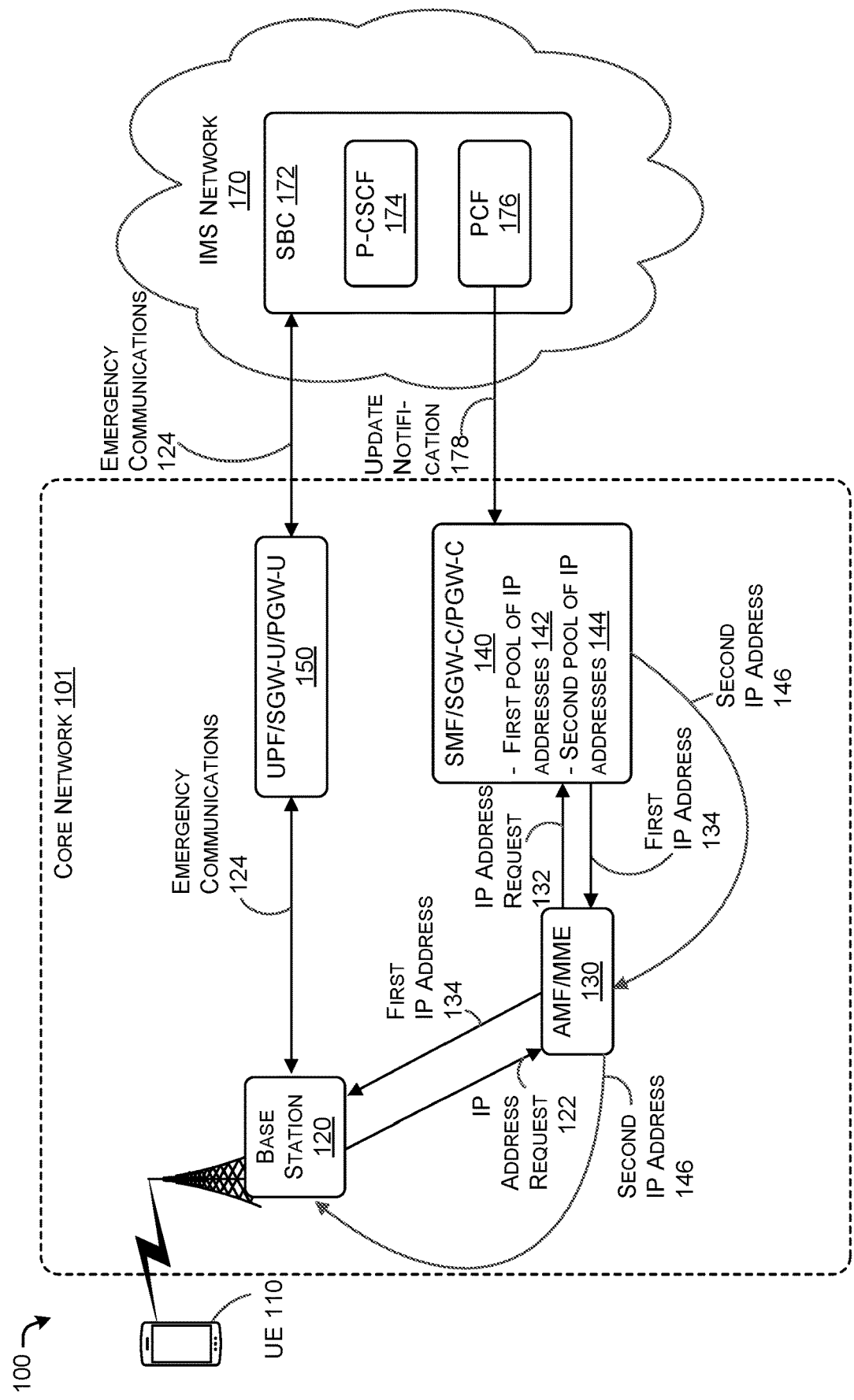
FIG. 1 is a schematic diagram of an illustrative wireless communications network environment in which efficient emergency communications fallback operations may be implemented, in accordance with examples of the disclosure.

This disclosure is directed in part to systems and techniques for performing emergency communications routing in wireless communications networks and other networks that emergency communications services. Such networks include any networks that may facilitate wireless communications services for one or more wireless communications devices. Such networks include networks that support one or more 3GPP standards, including, but not limited to, Long Term Evolution (LTE) networks (e.g., 4G LTE networks) and New Radio (NR) networks (e.g., 5G NR networks). However, the disclosed systems and techniques may be applicable in any network or system in which a user device may request and receive access to communicate with one or more network and/or remote devices using any protocol.

In conventional systems, a wireless user device (e.g., mobile telephone, smartphone, user equipment (UE), etc.; generally referred to as "UE" herein) may wirelessly communicate with a base station (e.g., gNodeB, eNodeB, NodeB, base transceiver station (BTS), etc.) to request wireless communications services, such as a packet data communication session between the user device and a data network (e.g., the Internet, an IP multimedia system or subsystem (IMS), etc.). In some examples, such a request for communications may be a request for emergency communications (e.g., request to initiate a 911 call or text). Various operations may be performed by network components, devices, and/or functions to obtain or otherwise establish the requested services for the wireless user device. Such operations may include authenticating the wireless user device and/or a user of the device, authorizing the requested services for the device and/or user, registering the device at the various systems and functions needed to provide the requested services, etc. In particular, a network operation may include determinizing or otherwise obtaining an IP address for the user device and providing that address to the user device for use in the requested communications. As used herein, a "request for communications" and a "communications request" may include, but are not limited to, any transmission of data from one device, component, or system that explicitly or implicitly indicates a request for transmission of at least a subset of that data or other data to another device, component, or system. For example, a communications request may be a packet, frame, and/or any other type of data unit transmitted from one device to another device; a request to establish a communications session of any type; a request by one device for data or any other type of response from another device; etc.

For example, a UE may transmit a request for a packet data communications session (e.g., a request to establish a protocol data unit (PDU) session or a packet data network (PDN) connection) with a data network to a base station. A communications session such as a PDU session or PDN connection, for example, in an LTE or NR network, may be an end-to-end communications session between a device (e.g., the UE) and a data network (e.g., the Internet, an IMS, etc.). Such connections or sessions may be referred to generally herein as "communications session" and may include, but are not limited to, any type of PDN connection, PDU session, and any other type of packet data communications connection or session. In some examples, the disclosed communications session may be an IP (e.g., IPv4 or IPv6) communications session.

The base station may relay or otherwise convey this communications session request to an access management component (e.g., an access management function (AMF) for NR networks, a mobility management entity (MME) for LTE networks, etc.) in the core of the wireless network in which the base station is configured. The access management component may interact with one or more other components to perform the operations needed to establish this communications session, such as authenticating the device and/or user, registering the UE with the network, etc. In a particular example, the access management component may interact with a session management component (e.g., a session management function (SMF) for NR networks, a serving gateway control plane function (SGW-C) and/or a packet data network gateway control plane function (PGW-C) for LTE networks, etc.) to establish the communications session and/or obtain SMF-related information to be used for communications session establishment on behalf of the UE. As part of this interaction, the access management component may request and receive, or otherwise obtain, an IP address from a session management component for the UE. The access management component may provide this address to the UE that may then use the address for communications with remote devices or systems via the wireless network.

A session management component may perform various session establishment operations, such as determining and assigning particular functions and/or components to service the session, associating policies for the session, etc. In some examples, an important function performed by a session management component may be providing the access information needed by the UE to communicate with a data network using the established session, including an address (e.g., IPv4 address or IPv6 address). The session management component provides this information to the access management component for relay to the base station and, ultimately, to the UE requesting the communications session. In some examples, the data provided to the access management component and/or the base station may include data indicating one or more user plane components (e.g., a user plane function (UPF) for NR networks, a serving gateway user plane function (SGW-U) and/or a packet data network gateway user plane function (PGW-U) for LTE networks, etc.) with which the UE, via the base station, may communicate to exchange user data with one or more destination devices and/or networks.

For example, the UE may use the provided address to transmit a request to establish a packet data communications session for exchanging user data to an indicated user plane component that may in turn provide that user data to an initial IMS network component, such as a session border controller (SBC). This initial IMS network component may in turn use the information accompanying the request (e.g., destination address) to route the user data to another component in the IMS network for further routing, etc., until the request reaches its intended destination.

As part of its routing determination operations, the SBC may determine if the IP address associated with a request from a UE is an authorized address. For example, the associated IMS network may be configured to service only IP addresses from a pool of authorized or permitted IP addresses and to block all other IP addresses that may be used to access the IMS network. A policy control function (PCF) of the SBC may maintain a list, database, and/or other data structure that indicates the IP addresses and/or pools or ranges thereof that are permitted on the IMS network. These addresses may be the same or a subset of the addresses configured on the core network for provisioning to UEs. For example, ideally a session management component (such as a session management function (SMF)) would provide IP addresses to UEs from a pool of addresses that are also indicated as authorized addresses at the PCF. Based on determining that the UE's IP address is an authorized IP address, the PCF is configured to send an update notification to the session management component (e.g., a session management function (SMF) for NR networks, a serving gateway control plane function (SGW-C) and/or a packet data network gateway control plane function (PGW-C) for LTE networks, etc.) in the core of the wireless network in which the base station is configured. The update notification may indicate a grant of access to the IMS network. The session management component may initiate a dedicated bearer request procedure based on receiving the update notification and send an emergency message through the dedicated bearer from the user equipment to the IMS network.

However, components and functions within a network, such as session management components, may vary and may change often due to operational circumstances (e.g., maintenance, load, upgrades, replacements, failures, etc.). For example, a particular session management component may be replaced by an upgraded session management component. Alternatively or additionally, a session management component may be added to a network, for example, to service an increased load of session requests from user devices. The IP addresses used in a core network and one or more associated IMS networks may also be expanded and/or changed from time to time. For example, a network provider may acquire another provider and may wish to configure its network to service devices using IP addresses associated with the acquired provider. Alternatively or additionally, a provider may add IP addresses to the available IP addresses serviced by its network, for example, to provide service to an increased number of user devices.

While ideally all components in a core network and any associated IMS networks would be up to date at all times with data indicating the set of authorized IP addresses for those networks, there is a possibility that the set of authorized IP addresses may not be synchronized across all components in such networks. For example, a new or upgraded service management component may be installed in a core network and/or configured with a (e.g., relatively) new set of authorized IP addresses (e.g., a first pool of IP addresses). However, there may be a delay or failure in updating one or more associated IMS components, such as a PCF, with this new set of authorized IP addresses. In such situations, the session management component may allocate an IP address (e.g., a first IP address) from the new set of authorized IP addresses (e.g., the first pool of IP addresses) to a UE before the IMS network is fully configured to recognize this new set of authorized IP addresses.

The results of this failure of synchronization of IP addresses across the core and IMS networks may be a failure to establish packet data communications sessions. For example, the UE may successfully acquire session data, including an IP address and a user plane component (e.g., user plane component identifier) from a session management component. Using this IP address, the UE may transmit a request to establish a packet data communications session to a destination system or component on an associated IMS network via the user plane component. The user plane component may forward or transmit this request to an SBC at the IMS network. The SBC may initiate an authorization authentication request (AAR) to the PCF to create a dedicated bearer. However, the PCF may not have the UE's IP address represented in its data structure indicating authorizes IP addresses and may therefore reject the request or otherwise block the request.

While this may introduce some delay in accessing the destination system or component for the user of the UE, typically this will be a minor inconvenience. However, in the case of emergency communications (e.g., 911 call or text, SOS call or text, etc.), the failure to establish this communications session may result in harm or injury to a user and/or otherwise delay the response of emergency services providers.

To address this issue of potentially rejecting attempts to place emergency calls while ensuring the typical unauthorized traffic does not transit an IMS network, a session management component (e.g., a session management function (SMF) for NR networks, a serving gateway control plane function (SGW-C) and/or a packet data network gateway control plane function (PGW-C) for LTE networks, etc.) in the core of the wireless network in which the base station is configured may automatically assign a new IP address (e.g., a second IP address) from a formerly authorized pool of IP addresses (e.g., a second pool of IP addresses) based on determining the session management component has not received an update notification from the PCF within a threshold time (e.g., 500 milliseconds, 1000 milliseconds, etc.) from transmitting a request to establish a packet data communications session to the SBC of the IMS network. The SBC may receive packets or other communications from the new IP address (e.g., the second IP address). The SBC may now route such communications normally because the new IP address used for the UE in such communications has been configured as an authorized IP address.

In some examples, the session management component may further mark the first pool of IP addresses as "off-line" based on determining the session management component has not received the update notification from the PCF within a threshold time (e.g., 500 milliseconds, 1000 milliseconds, etc.) from transmitting the request to establish the packet data communications session to the SBC of the IMS network.

By autonomously assigning a new IP address from a formerly authorized pool of IP addresses when a session management component has not received an update notification from a PCF within a threshold time from transmitting a request to establish a packet data communications session to an SBC of an IMS network, the systems and methods described herein provide more efficient emergency communications session establishment operations and reduced resource utilization, while ensuring that communications with emergency services providers are reliably established. By marking the first pool of IP addresses as "off-line" based on determining the session management component has not received the update notification request, the systems and the methods described herein minimize the likelihood of repeatedly attempting to establish an emergency communications session for a UE based on mismatched sets of authorized IP addresses between a core network and an IMS network, thereby improve the performance and increase the efficiency of both network and user resources. For example, the methods and systems described herein may be more efficient and/or more robust than conventional techniques, as they may increase the speed of the emergency communication session establishment process and reduce the wasting of resources on repeated attempts to establish emergency communications sessions after failed attempts using IP addresses not recognized as authorized in an IMS network. That is, the methods and systems described herein provide a technological improvement over existing emergency communications session establishment systems and processes by facilitating improved session establishment and increasing network efficiency by reducing the traffic associated with failed attempts to communicate using IP addresses not recognized as authorized in an IMS network. In addition to improving the efficiency of network and device resource utilization, the systems and methods described herein can provide more robust systems by, for example, making more efficient use of network devices by reducing unnecessary and/or unproductive device and network signaling and processing associated with attempting to communicate using IP addresses not recognized as authorized in an IMS network, thereby freeing network and device resources for more productive operations. Moreover, the systems and methods described herein can ensure that a user receives the attention needed from providers of emergency services without undue delay due to unsynchronized authorized IP addresses across a core network and an IMS network.

Illustrative environments, signal flows, and techniques for implementing systems and methods for emergency communications management are described below. However, the described systems and techniques may be implemented in other environments.

Illustrative System Architecture

FIG. 1 is a schematic diagram of an illustrative wireless network environment 100 in which the disclosed systems and techniques may be implemented. The environment 100 may include a UE 110 that may wirelessly communicate with a base station 120. The base station 120 may be any type of base station, including, but not limited to, any type of BTS, NodeB, eNodeB, gNodeB, etc. The base station 120 may communicate with other components and functions in a core network 101. The core network 101 may be any one or more networks that facilitate communications between particular devices, components, and/or functions of various types in the core of a wireless communications network that may facilitate communication between computing devices and/or mobile devices (e.g., UEs). Various connections between components and functions in the core network 101 may be wired, wireless, or a combination thereof. The components and functions described herein may be implemented as physical devices, as software components and/or functions executing on one or more computing devices, and as any combination thereof. In various embodiments, the core network 101 may facilitate the establishment of communications sessions for one or more wireless devices, such as UE 110. In some examples, the core network 101 may facilitate authorized packet-based communications between such wireless devices and other wireless devices, devices on the Internet, one or more IMSs, and/or one or more other data networks (DNs). For example, the core network 101 may facilitate packet-based (e.g., IP) communications between the UE 110 and an IMS network 170 that may be any one or more IMS networks. In some examples, a network computing device configured at the core network 101 may include one or more processors, one or more transceivers, and non-transitory computer-readable media storing computer-executable instructions configured to perform operations described in accordance with examples of the disclosure.

In FIG. 1, connections between components may be logical and/or communications connections that may be facilitated by one or more wired and/or wireless connections and may include traversal of one or more devices, components, and/or functions that may or may not be shown in FIG. 1.

In environment 100, the UE 110 may communicate with the base station 120 to request the establishment of a communications session (e.g., to communicate with one or more systems at the IMS network 170, such as a PDN connection or a PDU session). For example, the UE 110 may, as part of or inherent in requesting the establishment of a communication session, request an IP address for use in communicating with the IMS network 170. The base station 120 may relay the IP address request or otherwise transmit an IP address request 122 an AMF/MME 130, which may be any type of access management component as described herein. The IP address request 122 may be a network access request that provides information that the AMF/MME 130 may use to determine and/or obtain an IP address for the UE 110, such as an indication of the base station 120's tracking area code (TAC) and/or an indication of the UE 110's PDN-Type, which may have been provided by the UE 110 in the request to establish the communications session. For example, the US 110's PDN-Type may indicate that the UE is requesting an IPv4 address, an IPv6 address, or one of either an IPv4 address or an IPv6 address.

In various examples, the AMF/MME 130 may perform one or more operations to establish a communications session for the UE 110. For example, the AMF/MME 130 may perform or initiate operations to authenticate and authorize the UE 110 and/or a user associated with the UE 110, create contexts for a session, determine and apply session policies, establish user plane resources, etc. In some examples, the AMF/MME 130 may determine a session management component, such as SMF/SGW-C/PGW-C 140, for performing session management operations based on the UE 110, the base station 120, and/or the request PDN-Type. The AMF/MME 130 may transmit and/or forward an IP address request 132 based on the IP address request 122 to the SMF/SGW-C/PGW-C 140 requesting an IP address (e.g., among other session data) for the UE 110.

The SMF/SGW-C/PGW-C 140 may respond to the IP address request 132 with a message transmitted to the AMF/MME 130 that may include a first IP address 134. This message may further include other information, such as user plane data for use by the UE 110 (e.g., an indication of a user plane component, such as UPF/SGW-U/PGW-U 150). The SMF/SGW-C/PGW-C 140 may determine or obtain the first IP address 134 from a first pool of IP addresses 142, for example, configured at the SMF/SGW-C/PGW-C 140.

The AMF/MME 130 may provide the first IP address 134 to the base station 120 for configuration at the UE 110 for use in the requested communications session. The AMF/MME 130 may further provide other data for use by the base station 120 and/or UE 110 for the communications session.

Having received the first IP address 134, the UE 110 may now attempt to establish a packet communications session with a remote system or component. For example, the UE 110 may transmit an emergency communications message to the base station 120, which may recognize such communications as user data. The base station 120 may transmit this data as emergency communications 124 to the UPF/SGW-U/PGW-U 150. The UPF/SGW-U/PGW-U 150 may transmit the emergency communications 124 to the IMS network 170. In some examples, the UPF/SGW-U/PGW-U 150 may transmit the emergency communications 124 to a session border controller (SBC) 172 of the IMS Network 170.

The SBC 172 may send an authorization authentication request (AAR) based on the emergency communications 124 to a policy control function 175 to create a dedicated bearer. The PCF 176 may process the received authorization authentication request to determine whether the emergency communications 124 have originated at an authorized system, device, and/or address. For example, the PCF 176 may be configured with a set or list of authorized IP addresses that are permitted access to the IMS network 170. If the PCF 176 determines that the received emergency communications 124 is associated with one of these authorized IP addresses, the PCF may send an update notification 178 to the SMF/SGW-C/PGW-C 140 indicating a grant of access to the IMS network 170. The SMF/SGW-C/PGW-C 140 may initiate a dedicated bearer request procedure based on receiving the update notification and send emergency message through the dedicated bearer from the UE 110 to the IMS network 170, and a proxy call session control function (P-CSCF) 174 of the SBC 172 may determine an appropriate call session control function to which to forward the communications and/or an appropriate destination for such communications.

However, if the PCF 176 determines that the received emergency communications 124 is from a non-authorized IP address (or from a non-authorized device, system, or component), the PCF 176 may not send the update notification 178 to the SMF/SGW-C/PGW-C 140, and the P-CSCF 174 may not route or forward that data or communications. For example, if the received communications are associated with an IP address that is not included in the set of authorized IP addresses stored or obtained by the PCF 176 representing the addresses that are permitted access to the IMS network 170, the PCF 176 may reject those communications (e.g., drop the associated packet and/or transmit a message indicating a denial of access to the IMS network 170). While this prevents unauthorized use of the resources of the IMS network 170, this denial of access may not be desirable if received communications is associated with an emergency.

In some examples, the first IP address 134 provided to the base station 120 for use by the UE 110 may be determined based on a set of authorized IP addresses stored or obtained by the SMF/SGW-C/PGW-C 140 that have not (e.g., yet) been configured at the PCF 176. Thus, the emergency communications 124 provided to the SBC 172 by the UPF/SGW-U/PGW-U 150 and based on the emergency communications 124 may be rejected by the PCF 176.

To address this authorized IP address mismatch between the core network 101 and the IMS network 170 so that the emergency communications 124 are provided access to the IMS network 170, in various examples, the SMF/SGW-C/PGW-C 140 of the core network 101, may automatically assign a second IP address 146 from a formerly authorized pool of IP addresses (e.g., a second pool of IP addresses 144) based on determining the SMF/SGW-C/PGW-C 140 has not received the update notification 178 from the PCF 176 within a threshold time (e.g., 500 milliseconds, 1000 milliseconds, etc.) from transmitting the emergency communications 124 to the SBC 172 of the IMS network 170.

The AMF/MME 130 may provide the second IP address 146 to the base station 120 for configuration at the UE 110 for use in the requested communications session. Having received the second IP address 146, the UE 110 may now establish a packet communications session with the IMS network 170 using the second IP address 146. The SBC 172 may receive packets or other communications from the second IP address 146. The P-CSCF 174 may now route such communications normally because the second IP address 146 used for the UE 110 in such communications has been configured as an authorized IP address. By autonomously assigning the second IP address 146 from a formerly authorized pool of IP addresses (e.g., the second pool of IP addresses 144) when the SMF/SGW-C/PGW-C 140 has not received an update notification from the PCF 176 within a threshold time (e.g., 500 milliseconds, 1000 milliseconds, etc.) from transmitting the emergency communications 124 to the SBC 172 of the IMS network 170, the systems and methods described herein provide more efficient emergency communications session establishment operations and reduced resource utilization, while ensuring that communications with emergency services providers are reliably established.

In some examples, the SMF/SGW-C/PGW-C 140 may further mark the first pool of IP addresses 142 as "off-line" based on determining the SMF/SGW-C/PGW-C 140 has not received the update notification from the PCF 176 within a threshold time (e.g., 500 milliseconds, 1000 milliseconds, etc.) from transmitting the emergency communications 124 to the SBC 172 of the IMS network 170. By marking the first pool of IP addresses 142 as "off-line" based on determining the SMF/SGW-C/PGW-C 140 has not received an update notification from the PCF 176 within a threshold time (e.g., 500 milliseconds, 1000 milliseconds, etc.) from transmitting the emergency communications 124 to the SBC 172 of the IMS network 170, the systems and the methods described herein minimize the likelihood of repeatedly attempting to establish an emergency communications session for the UE 110 based on mismatched sets of authorized IP addresses between the core network 101 and the IMS network 170, thereby improve the performance and increase the efficiency of both network and user resources.

Illustrative Functions and Communications

Figure 2:
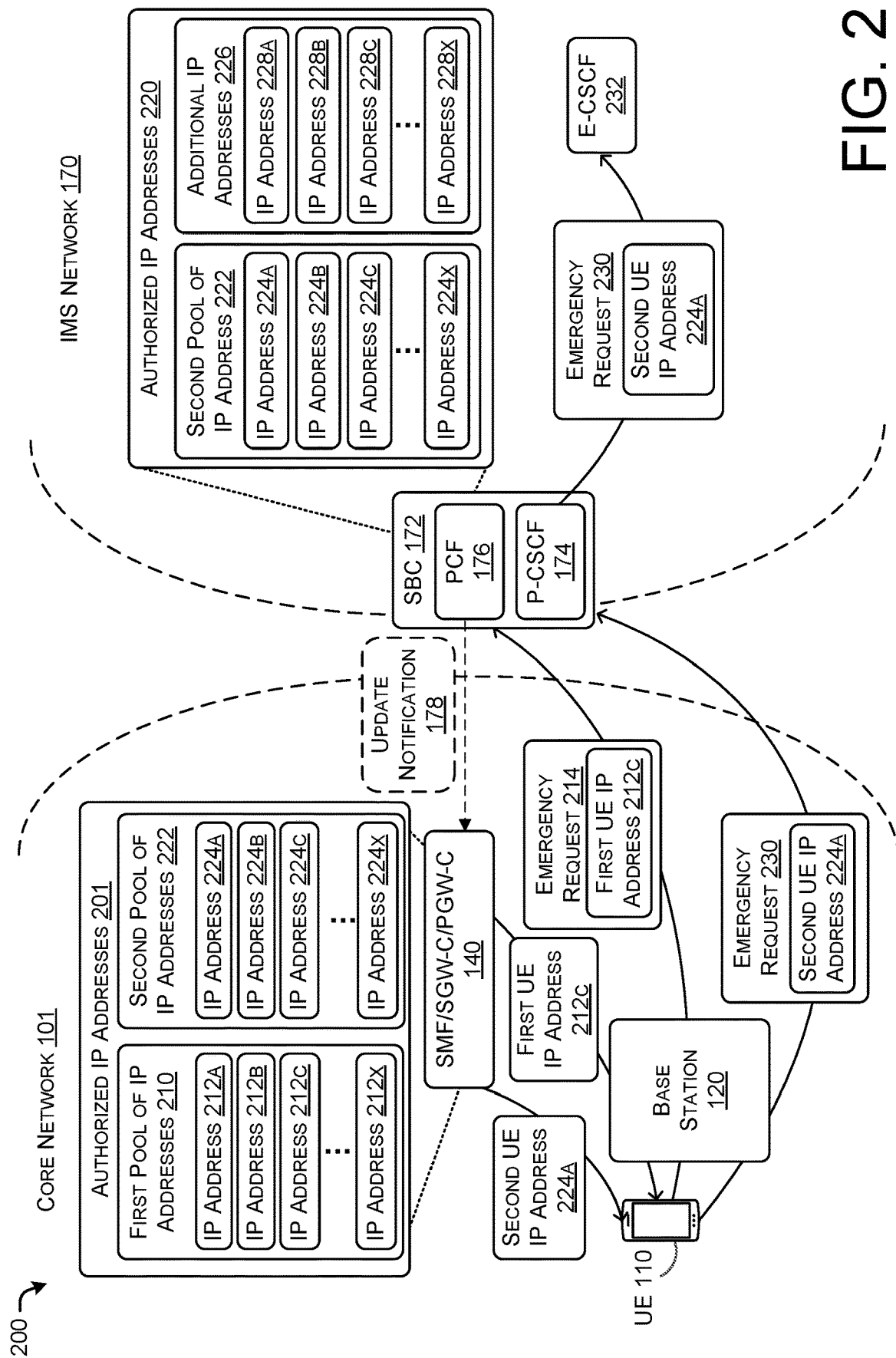
FIG. 2 is a schematic diagram of illustrative functions and communications that may be implemented in a wireless communications network in which efficient emergency communications fallback operations may be implemented, in accordance with examples of the disclosure.

FIG. 2 illustrates a schematic diagram of exemplary functions and communications of various messages that may be exchanged in one or more of the disclosed systems and techniques for emergency communications management as described herein. Reference may be made in this description of the exemplary functions and communications to devices, messages, functions, components, and/or operations illustrated in FIG. 1 and described in regard to that figure. However, the functions and communications illustrated in FIG. 2 and described herein may be implemented in any suitable system and/or with any one or more suitable devices and/or entities. Moreover, any of the functions and communications described in regard to FIG. 2 may be used separately and/or in conjunction with other functions and communications and/or implemented using devices, systems, and or operations. All such embodiments are contemplated as within the scope of the instant disclosure.

FIG. 2 illustrates a schematic diagram 200 that may represent a subset of the functions and components represented in environment 100 of FIG. 1. In this example, the SMF/SGW-C/PGW-C 140 may be configured with, or may otherwise determine or obtain, a set of authorized IP addresses 201. The set of authorized IP addresses 201 may include at least a first pool of authorized IP addresses 210 that may include IP addresses $212a \ldots x$, and a second pool of authorized IP addresses 222 that may include IP addresses $224a \ldots x$. Included in session establishment and management operations, the SMF/SGW-C/PGW-C 140 may determine a first UE IP address 212c from the first pool of authorized IP addresses 210 and provide the first UE IP address 212c to the base station 120 for configuration at the UE 110. The UE 110 may be configured with the first UE IP address 212c and initiate an emergency communications request 214 that includes the first UE IP address 212c (e.g., as a source address). The emergency communications request 214 may be transmitted, relayed, and/or otherwise provided to the SBC 172 via one or more other components (not shown), including, but not limited to, as described herein.

The PCF 176 of the SBC 172 may be configured with, or may otherwise determine or obtain, a set of authorized IP addresses 220 that may include the second pool of IP addresses 222 and additional IP addresses 226. For various reasons as described herein, the set of authorized IP addresses 220 may not fully match or otherwise correspond to the set of authorized IP addresses 201.

In response to receiving the emergency communications request 214, the PCF 176 may determine whether the emergency communications 124 have originated at an authorized system, device, and/or address. For example, the PCF 176 may determine whether the first UE IP address 212c is included in the set of authorized IP addresses 220. If the PCF 176 determines the first UE IP address 212c is included in the set of authorized IP addresses 220, the PCF 176 will send the update notification 178 to the SMF/SGW-C/PGW-C 140 indicating a grant of access to the IMS network 170.

However, if the PCF 176 determines the first UE IP address 212c is not included in the set of authorized IP addresses 220, the PCF 176 may reject the emergency communications 124, and the PCF 176 will not send the update notification 178 to the SMF/SGW-C/PGW-C 140. In response to determining that the SMF/SGW-C/PGW-C 140 has not received the update notification 178 from the PCF 176 within a threshold time (e.g., 500 milliseconds, 1000 milliseconds, etc.) from transmitting the emergency communications 124 to the SBC 172 of the IMS network 170, the SMF/SGW-C/PGW-C 140 automatically assign a second UE IP address 224a from the second pool of authorized IP addresses 222 and provide the second UE IP address 224a to the base station 120 for configuration at the UE 110. The UE 110 may be configured with the second UE IP address 224a and initiate another emergency communications request 230 that includes the second UE IP address 224a. The emergency communications request 230 may then be transmitted, relayed, and/or otherwise provided to the SBC 172. The SBC 172 may receive the emergency communication request 230 from the second UE IP address 224a. The P-CSCF 174 may now route the emergency request 230 because the second UE IP address 224a used for the UE 110 in such communications has been configured as an authorized IP address. In some examples, the P-CSCF 174 may route the emergency request 230 to an emergency call session control function 232 (E-CSCF) for forwarding to an emergency services server or other emergency system or component.

In some examples, the SMF/SGW-C/PGW-C 140 may further mark the first pool of IP addresses 210 as "off-line" based on determining the SMF/SGW-C/PGW-C 140 has not received the update notification 178 from the PCF 176 within a threshold time (e.g., 500 milliseconds, 1000 milliseconds, etc.) from transmitting the emergency communications request 214 to the SBC 172 of the IMS network 170.

Illustrative Operations

Figure 3:
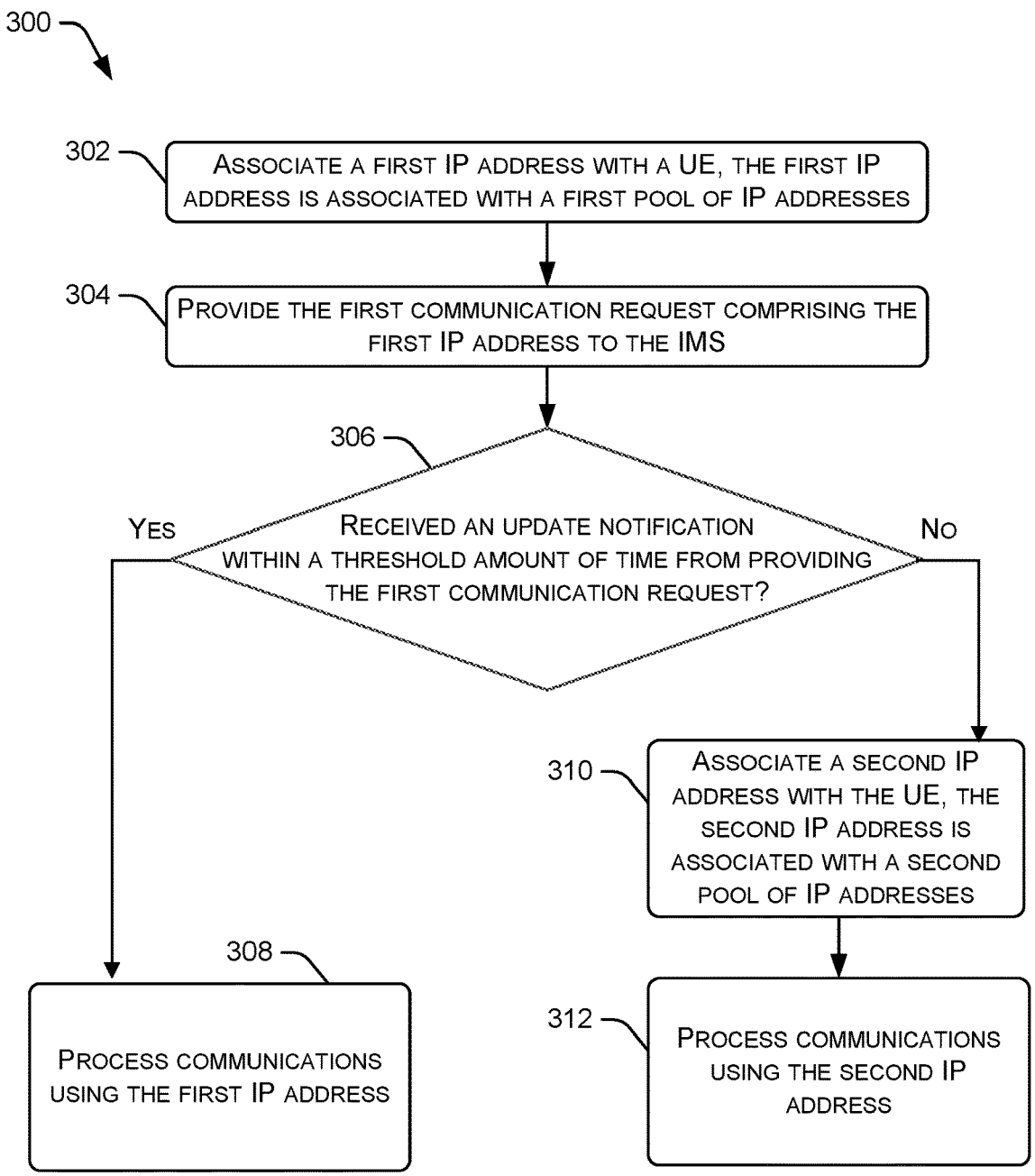
FIG. 3 is a flow diagram of an illustrative process for performing efficient emergency communications fallback operations, in accordance with examples of the disclosure.

FIG. 3 shows a flow diagram of an illustrative process 300 for emergency communications management according to the disclosed embodiments. The process 300 is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 300 may be described with reference to the wireless network environment 100 of FIG. 1, however, other environments may also be used.

At operation 302, a first IP address may be associated with a UE, and the first IP address may be associated with a first pool of IP addresses. For example, a session management function in a core network may associate the first IP address with the UE.

At operation 304, a first communication request comprising the first IP address may be provided to an IMS network via the core network. For example, user plane function may provide the first communication request comprising the first IP address to a session border controller at the IMS network. A policy control function of the session border controller may determine if the first IP address associated with the first communication request is an authorized address. If the policy control function determines the first IP address associated with the first communication request is an authorized address, the policy control function may send an update notification to the session management function in the core network indicating a grant of access to the IMS network. If the policy control function determines the first IP address associated with the first communication request is not an authorized address, the policy control function may reject the first communication request and the update notification may not be send to the core network.

At operation 306, the session management function in the core network may determine whether an update notification is received within a threshold amount of time (e.g., 500 milliseconds, 1000 milliseconds, etc.) from transmitting the first communication request to establish a packet data communications session to the session border controller of the IMS network.

If the session management function in the core network determines an updated notification has been received within the threshold amount of time from transmitting the first communication request, the core network may process communications using the first IP address at operation 308.

If the session management function in the core network determines an updated notification have not been received within the threshold amount of time from transmitting the first communication request, the session management function in the core network may associate a second IP address with the UE at operation 310. The second IP address may be determined from a formerly authorized pool of IP addresses, such as a second pool of IP addresses.

At operation 312, the core network may process communications using the second IP address.

Example User Equipment

Figure 4:
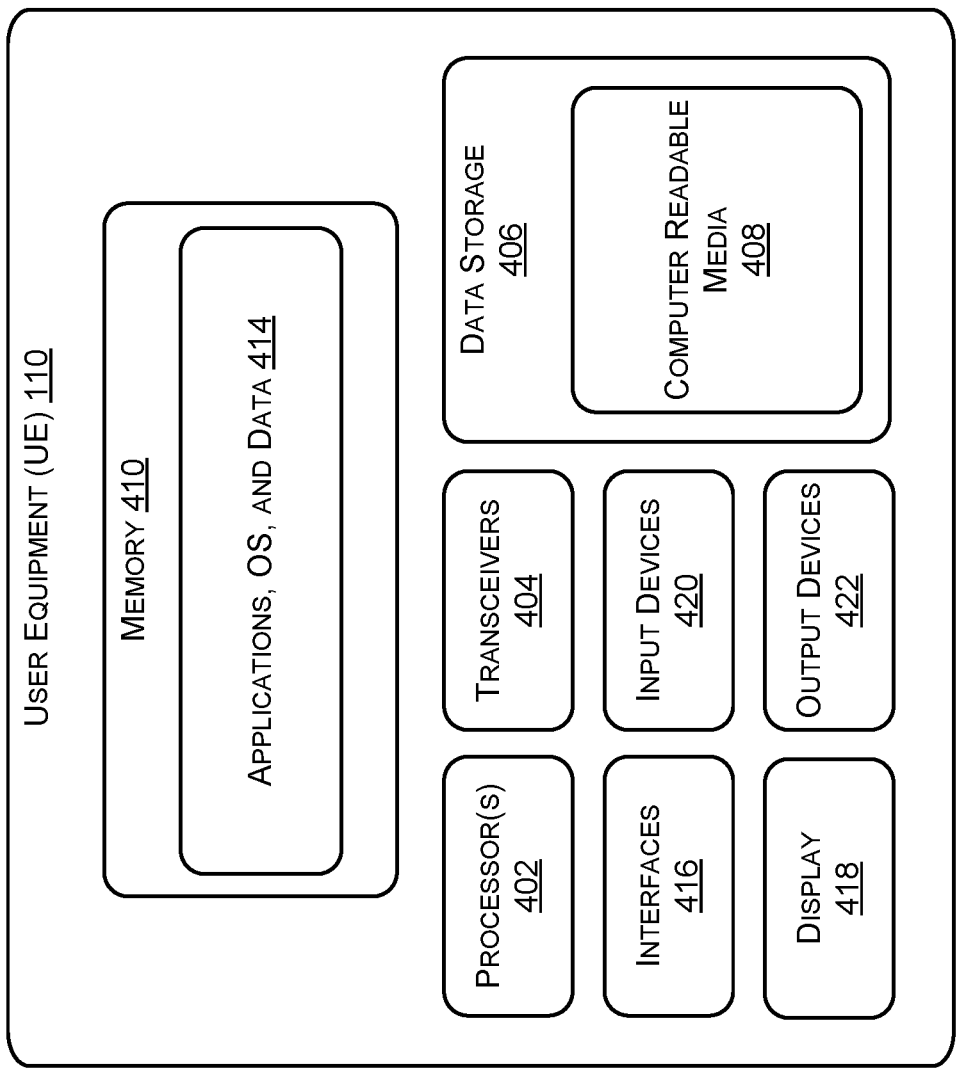
FIG. 4 is a schematic diagram of illustrative components in an example user device that is configured for interacting with a wireless communications network that implements efficient emergency communications fallback operations, in accordance with examples of the disclosure.

FIG. 4 is an example of a UE, such as UE 110, for use with the systems and methods disclosed herein, in accordance with some examples of the present disclosure. The UE 110 may include one or more processors 402, one or more transmit/receive antennas (e.g., transceivers or transceiver antennas) 404, and a data storage 406. The data storage 406 may include a computer-readable media 408 in the form of memory and/or cache. This computer-readable media may include a non-transitory computer-readable media. The processor(s) 402 may be configured to execute instructions, which can be stored in the computer-readable media 408 and/or in other computer-readable media accessible to the processor(s) 402. In some configurations, the processor(s) 402 is a Central Processing Unit (CPU), a Graphics Processing Unit (GPU), or both CPU and GPU, or any other sort of processing unit. The transceiver antenna(s) 404 can exchange signals with a base station, such as base station 120.

The UE 110 may be configured with a memory 410. The memory 410 may be implemented within, or separate from, the data storage 406 and/or the computer-readable media 408. The memory 410 may include any available physical media accessible by a computing device to implement the instructions stored thereon. For example, the memory 410 may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which may be used to store the desired information and which may be accessed by the UE 110.

The memory 410 can store several modules, such as instructions, data stores, and so forth that are configured to execute on the processor(s) 402. In configurations, the memory 410 may also store one or more applications 414 configured to receive and/or provide voice, data, and messages (e.g., SMS messages, Multi-Media Message Service (MMS) messages, Instant Messaging (IM) messages, Enhanced Message Service (EMS) messages, etc.) to and/or from another device or component (e.g., the base station 120). The applications 414 may also include one or more operating systems and/or one or more third-party applications that provide additional functionality to the UE 110. The memory may also, or instead, store bandwidth information, such as UE-supported bands, bandwidth(s) and bandwidth parts, one or more IP addresses, indications of sets of IP addresses, as well as communications session information such as UE-specific carrier bandwidth(s). The memory may also, or instead, store permit list and/or block list information, PDN-Type information, session management component information, user plane component information, policy component information, etc.

Although not all illustrated in FIG. 4, the UE 110 may also comprise various other components, e.g., a battery, a charging unit, one or more network interfaces 416, an audio interface, a display 418, a keypad or keyboard, and one or more input devices 420, and one or more output devices 422.

Example Computing Device

Figure 5:
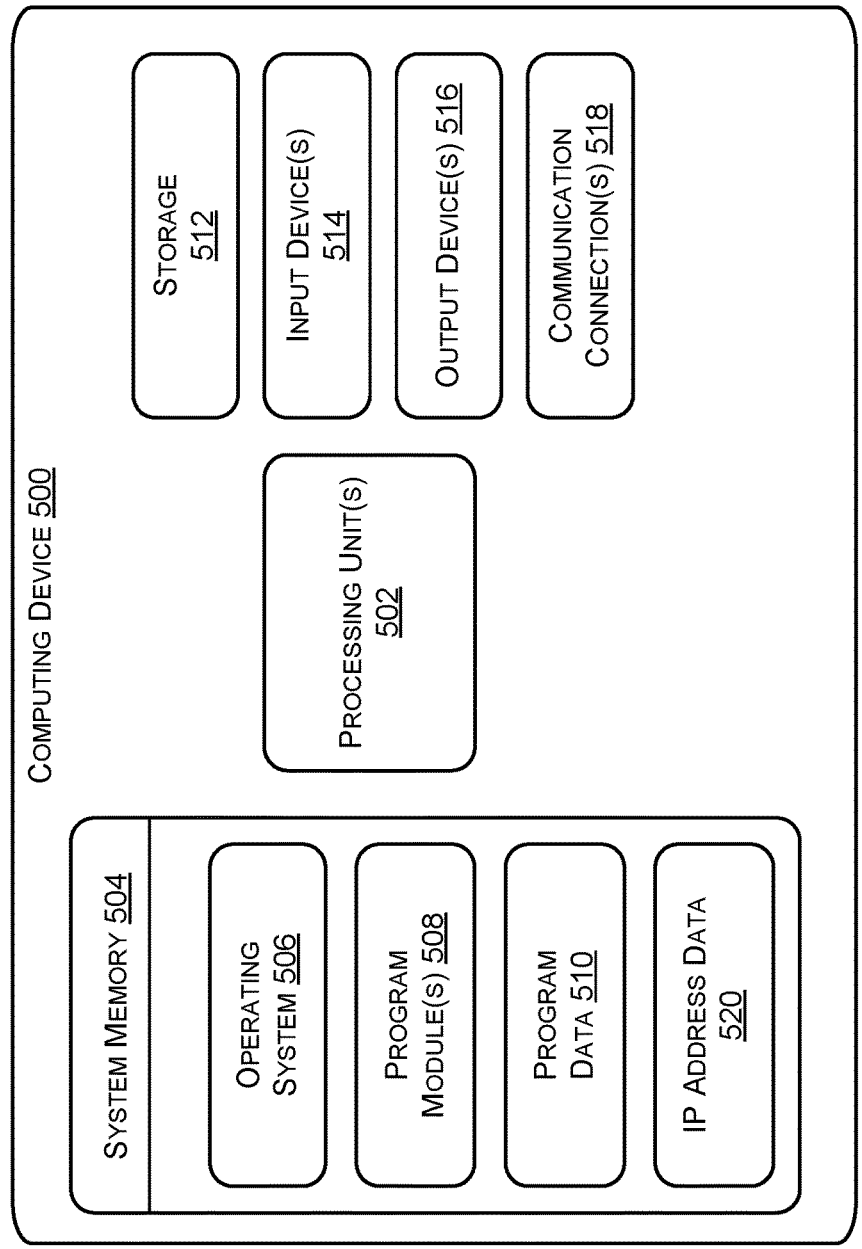
FIG. 5 is a schematic diagram of illustrative components in an example computing device that is configured for performing one or more aspects of efficient emergency communications fallback operations, in accordance with examples of the disclosure.

FIG. 5 is an example of a computing device 500 for use with the systems and methods disclosed herein, in accordance with some examples of the present disclosure. The computing device 500 can be used to implement various components of a core network (e.g., base station 120, AMF/MME 130, SMF/SGW-C/PGW-C 140, UPF/SGW-U/PGW-U 150), a base station, and/or any servers, routers, gateways, gateway elements, administrative components, IMS network components (e.g., SBC 172, P-CSCF 174, PCF 176, etc.), etc. that can be used by a communication provider.

In various embodiments, the computing device 500 can include one or more processing units 502 and system memory 504. Depending on the exact configuration and type of computing device, the system memory 504 can be volatile (such as RAM), nonvolatile (such as ROM, flash memory, etc.) or some combination of the two. The system memory 504 can include an operating system 506, one or more program modules 508, program data 510, and IP address data 520 (e.g., configured IP address, authorized IP addresses, etc.). The system memory 504 may be secure storage or at least a portion of the system memory 504 can include secure storage. The secure storage can prevent unauthorized access to data stored in the secure storage. For example, data stored in the secure storage can be encrypted or accessed via a security key and/or password.

The computing device 500 can also include additional data storage devices (removable and/or non-removable) such as, for example, magnetic disks, optical disks, or tape. Such additional storage is illustrated in FIG. 5 by storage 512.

The computing device 500 may store, in either or both of the system memory 504 and the storage 512, IP addresses, IP address data, block list information, permit list information, associated functions, timer information and/or timestamps, message transfer data, PDU session information, session management data, etc.

Non-transitory computer storage media of the computing device 500 can include volatile and nonvolatile, removable and non-removable media implemented in any method or technology for storage of information, such as computer-readable instructions, data structures, program modules, or other data. The system memory 504 and storage 512 are examples of computer-readable storage media. Non-transitory computer-readable storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by computing device 500. Any such non-transitory computer-readable storage media can be part of the computing device 500.

In various embodiments, any or all of the system memory 504 and storage 512 can store programming instructions which, when executed, implement some or all of the functionality described above as being implemented by one or more systems configured in the environment 100 and/or components of the core network 101 and/or the IMS network 170.

The computing device 500 can also have one or more input devices 514 such as a keyboard, a mouse, a touch-sensitive display, voice input device, etc. The computing device 500 can also have one or more output devices 516 such as a display, speakers, a printer, etc. can also be included. The computing device 500 can also contain one or more communication connections 518 that allow the device to communicate with other computing devices using wired and/or wireless communications.

Conclusion

Depending on the embodiment, certain operations, acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, components, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and components described in connection with the embodiments disclosed herein can be implemented or performed by a machine, such as a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements, and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Unless otherwise explicitly stated, articles such as "a" or "the" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method performed by a one or more computing devices configured in a wireless communications network, the method comprising:
   associating, by a first component of a core network associated with an Internet protocol (IP) multimedia system (IMS), a first IP address with a user equipment (UE), wherein the first IP address is associated with a first pool of IP addresses;
   providing, by a second component of the core network, a first communications request comprising the first IP address associated with the UE to the IMS;
   determining, by the second component of the core network and based at least in part on not receiving an update notification from the IMS within a threshold amount of time from providing the first communication request to the IMS, the first IP address is not represented in a set of IP addresses configured at the IMS;
   based at least in part on determining that first IP address is not represented in the set of IP addresses configured at the IMS, associating a second IP address with the UE, wherein the second IP address is associated with a second pool of IP addresses different from the first pool of IP addresses; and
   providing, by the second component of the core network, a second communication request comprising the second IP address associated with the UE to the IMS.

2. The method of claim 1, further comprising:
   based at least in part on determining that the first IP address is not represented in the set of IP addresses configured at the IMS, marking the first pool of IP addresses as off-line.

3. The method of claim 1, wherein the first component of the core network comprises a session management function (SMF), a serving gateway control plane function (SGW-C), or a packet data network gateway control plane function (PGW-C).

4. The method of claim 1, wherein the second component of the core network comprises a user plane component.

5. The method of claim 1, further comprising:
   receiving the update notification from the IMS within the threshold amount of time from providing the second communication request to the IMS; and
   determining, by the second component of the core network and based at least in part on receiving the update notification from the IMS within the threshold amount of time from providing the second communication request to the IMS, the second IP address is represented in the set of IP addresses configured at the IMS.

6. The method of claim 5, wherein the update notification is provided by a policy control function (PCF) of the IMS.

7. The method of claim 5, wherein the second communication request is configured to be routed to an emergency call session control function (E-CSCF) of the IMS.

8. A network computing device configured at a wireless communications network, the network computing device comprising:
   one or more processors;
   one or more transceivers; and
   non-transitory computer-readable media storing computer-executable instructions that, when executed by the one or more processors, cause the one or more processors to perform operations comprising:
      associating, by a first component of a core network associated with an Internet protocol (IP) multimedia system (IMS), a first IP address with a user equipment (UE), wherein the first IP address is associated with a first pool of IP addresses;
      providing, by a second component of the core network, a first communications request comprising the first IP address associated with the UE to the IMS;
      determining, by the second component of the core network and based at least in part on not receiving an update notification from the IMS within a threshold amount of time from providing the first communication request to the IMS, the first IP address is not represented in a set of IP addresses configured at the IMS;
      based at least in part on determining that first IP address is not represented in the set of IP addresses configured at the IMS, associating a second IP address with the UE, wherein the second IP address is associated with a second pool of IP addresses different from the first pool of IP addresses; and
      providing, by the second component of the core network, a second communication request comprising the second IP address associated with the UE to the IMS.

9. The network computing device of claim 8, wherein the operations further comprise:
   based at least in part on determining that the first IP address is not represented in the set of IP addresses configured at the IMS, marking the second pool of IP addresses as off-line.

10. The network computing device of claim 8, wherein the first component of the core network comprises a session management function (SMF), a serving gateway control plane function (SGW-C), or a packet data network gateway control plane function (PGW-C).

11. The network computing device of claim 8, wherein the second component of the core network comprises a user plane component.

12. The network computing device of claim 8, wherein the operations further comprise:
receiving the update notification from the IMS within the threshold amount of time from providing the second communication request to the IMS; and
determining, by the second component of the core network and based at least in part on receiving the update notification from the IMS within the threshold amount of time from providing the second communication request to the IMS, the second IP address is represented in the set of IP addresses configured at the IMS.

13. The network computing device of claim 8, wherein the update notification is provided by a policy control function (PCF) of the IMS.

14. The network computing device of claim 13, wherein the second communication request is configured to be routed to an emergency call session control function (E-CSCF) of the IMS.

15. A non-transitory computer-readable media storing computer-executable instructions that, when executed by one or more processors, cause the one or more processors to perform operations comprising:
associating, by a first component of a core network associated with an Internet protocol (IP) multimedia system (IMS), a first IP address with a user equipment (UE), wherein the first IP address is associated with a first pool of IP addresses;
providing, by a second component of the core network, a first communications request comprising the first IP address associated with the UE to the IMS;
determining, by the second component of the core network and based at least in part on not receiving an update notification from the IMS within a threshold amount of time from providing the first communication request to the IMS, the first IP address is not represented in a set of IP addresses configured at the IMS;
based at least in part on determining that first IP address is not represented in the set of IP addresses configured at the IMS, associating a second IP address with the UE, wherein the second IP address is associated with a second pool of IP addresses different from the first pool of IP addresses; and
providing, by the second component of the core network, a second communication request comprising the second IP address associated with the UE to the IMS.

16. The non-transitory computer-readable media of claim 15, wherein the operations further comprise:
based at least in part on determining that the first IP address is not represented in the set of IP addresses configured at the IMS, marking the second pool of IP addresses as off-line.

17. The non-transitory computer-readable media of claim 15, wherein the first component of the core network comprises a session management function (SMF), a serving gateway control plane function (SGW-C), or a packet data network gateway control plane function (PGW-C).

18. The non-transitory computer-readable media of claim 15, wherein the second component of the core network comprises a user plane component.

19. The non-transitory computer-readable media of claim 15, wherein the operations further comprise:
receiving the update notification from the IMS within the threshold amount of time from providing the second communication request to the IMS; and
determining, by the second component of the core network and based at least in part on receiving the update notification from the IMS within the threshold amount of time from providing the second communication request to the IMS, the second IP address is represented in the set of IP addresses configured at the IMS.

20. The non-transitory computer-readable media of claim 15, wherein the update notification is provided by a policy control function (PCF) of the IMS.

* * * * *